(12) United States Patent
Hammarwall et al.

(10) Patent No.: US 8,873,533 B2
(45) Date of Patent: Oct. 28, 2014

(54) METHOD AND A TRANSMITTER IN A WIRELESS COMMUNICATION NETWORK

(75) Inventors: David Hammarwall, Stockholm (SE); George Jongren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 839 days.

(21) Appl. No.: 13/128,924

(22) PCT Filed: Nov. 10, 2009

(86) PCT No.: PCT/IB2009/007418
§ 371 (c)(1),
(2), (4) Date: May 12, 2011

(87) PCT Pub. No.: WO2010/055391
PCT Pub. Date: May 20, 2010

(65) Prior Publication Data
US 2011/0228758 A1  Sep. 22, 2011

Related U.S. Application Data

(60) Provisional application No. 61/113,948, filed on Nov. 12, 2008.

(51) Int. Cl.
*H04B 7/208* (2006.01)
*H04L 27/26* (2006.01)
*H04L 25/03* (2006.01)
*H04L 5/00* (2006.01)

(52) U.S. Cl.
CPC ....... *H04L 27/2614* (2013.01); *H04L 25/03343* (2013.01); *H04L 5/0023* (2013.01); *H04L 2025/03426* (2013.01)
USPC .......................................... 370/344

(58) Field of Classification Search
CPC ............ H04L 5/0023; H04L 2025/03426; H04L 25/03343; H04L 27/2614
USPC .......................................... 370/344
See application file for complete search history.

(56) References Cited

U.S. PATENT DOCUMENTS

| | | | |
|---|---|---|---|
| 2005/0272382 A1 | 12/2005 | Amano | |
| 2006/0245346 A1* | 11/2006 | Bar-Ness et al. | 370/203 |
| 2006/0250182 A1* | 11/2006 | Takeda et al. | 330/129 |
| 2008/0132176 A1* | 6/2008 | Tudosoiu et al. | 455/73 |

(Continued)

FOREIGN PATENT DOCUMENTS

WO  WO 2008/103805 A  8/2008

OTHER PUBLICATIONS

Hyung G Myung et al: "Peak Power Characteristics of Single Carrier FDMA MIMO Precoding System" IEEE 66$^{th}$ Vehicular Technology Conference, 2007, Sep. 1, 2007, XP031147449, NY, USA, ISBN: 978-1-4244-0263-2.

*Primary Examiner* — Asad Nawaz
*Assistant Examiner* — Saad A Waqas

(57) ABSTRACT

The object of the present invention is to achieve a solution for handling the increased PAPR that is introduced by the FD and/or TD multi-antenna processing. This is achieved by isolating the PAPR increase to one, or a few antennas, that are matched with more powerful PAs, whereas the remaining antennas may use simpler/smaller PAs amplifying signals with smaller PAPRs.

14 Claims, 6 Drawing Sheets

(56) References Cited

U.S. PATENT DOCUMENTS

| | | |
|---|---|---|
| 2008/0192849 A1 | 8/2008 | Kim et al. |
| 2008/0205539 A1* | 8/2008 | Wang et al. .................. 375/267 |
| 2008/0298316 A1* | 12/2008 | Bitran et al. .................. 370/329 |
| 2009/0232191 A1* | 9/2009 | Gupta et al. .................. 375/216 |
| 2011/0129029 A1* | 6/2011 | Liu et al. ....................... 375/267 |
| 2011/0176502 A1* | 7/2011 | Chung et al. .................. 370/329 |

* cited by examiner

US 8,873,533 B2

METHOD AND A TRANSMITTER IN A WIRELESS COMMUNICATION NETWORK

This application claims the benefit of U.S. Provisional Application No. 61/113,948, filed Nov. 12, 2008, the disclosure of which is fully incorporated herein by reference.

TECHNICAL FIELD

The present invention relates to a method and a transmitter in a wireless communication network with multiple antennas and particular to Peak to Average Ratio (PAPR) robust MIMO processing exploiting power amplifier asymmetries.

BACKGROUND

Multi-antenna techniques can significantly increase the data rates and reliability of a wireless communication system. The performance is in particular improved if both the transmitter and the receiver are equipped with multiple antennas. This result in a multiple-input multiple-output (MIMO) communication channel and such systems and/or related techniques is commonly referred to as MIMO. A core component in mobile telecommunication networks of the $4^{th}$ generation is the support of MIMO antenna deployments and MIMO related techniques.

An important aspect in the design of the transmission scheme is the peak to average power ratio (PAPR), which is a measure of how large the transmitted power peaks are in relation to the average power. (Although PAPR can be interpreted as a definition of a specific measure of the dynamics of a signal, PAPR is in this specification taken as a generic term that could map into several different forms of measures of dynamic range, including cubic metric.) The main problem with a large PAPR is that the transmitted signal should be within the, so called, linearity range of the power amplifiers (PAs). When the power peaks become too large, the PAs will cause clipping and/or other signal distortions that destroys the overall linearity of the effective propagation channel. Therefore, the PA design should be matched to the peaks of the transmitted signal. This is not so much of an issue in the downlink (DL) as in the uplink (UL), since the PAs at the radio base station, referred to as NodeB, do not suffer from the same cost, space, and power conception constraints as the PAs in the user equipment (UE).

To address the PAPR issue in the UL, the LTE standard has adopted single carrier frequency division multiple access (SC-FDMA), in favor of traditional orthogonal frequency division multiple access (OFDMA).

The SC-FDMA transmission scheme is illustrated in FIG. 1 and FIG. 4 for multi-antenna processing in the frequency domain (FD) and in the time domain (TD), respectively. Hence antenna ports 607 and a transmitter 606 are schematically illustrated. The case with frequency domain multi-antenna processing can be summarized as follows. First the information bit stream is encoded (e.g., using a turbo code) into one or several codewords that are mapped onto a sequence of N symbol vectors of modulation symbols, $s(0), \ldots, s(N-1)$. Each vector, $s(k)$, has r elements, which corresponds to the transmission rank of the system; that is, how many data streams that are transmitted in parallel over the multi-antenna propagation channel. The main difference between SC-FDMA and OFDMA is that in SC-FDMA the symbol vectors belong to the time domain (TD), and are mapped to the frequency domain (FD), $s_0, \ldots, s_{N-1}$, with a discrete Fourier transform (DFT) 140. The FD symbol vectors are next mapped onto N-1 different FD transmission symbol vectors, $x_{0+k}, \ldots, x_{N-1+k}$, with a FD multi-antenna processing step 110, where k is the starting index of the allocation in the frequency domain. The symbols vectors, $x_{0+k}, \ldots, x_{N-1+k}$, are mapped onto the consecutive sub-carriers, $k, \ldots, N-1+k$, that have been allocated to the transmission. There is a one-to-one correspondence between the elements of $x_n$ and the antenna ports; that is, the lth element of $x_n$ corresponds to the signal of the nth sub-carrier on the lth antenna port. The FD transmission vectors are converted back to TD using an inverse fast Fourier transform (IFFT) 150 and application of a cyclic prefix (CP), into $x(0), \ldots, x(N_c+N_{cp}-1)$, were $N_c$ is the number of sub-carriers and $N_{cp}$ is the length of the cyclic prefix. Alternatively the multi-antenna processing of the signal can be performed in TD, as illustrated by FIG. 4, where the DFT is applied after the multi-antenna processing of the modulated symbols. It is also conceivable to have processing in both TD and FD.

The ambition with this SC-FDMA processing is that PAPR properties of the TD symbol vectors $s(0), \ldots, s(N-1)$ should be preserved in the transmitted symbol vectors $x(0), \ldots, x(N_c+N_{cp}-1)$. Given that the FD (and/or TD) processing step satisfies a number of constraints, the DFT operation (that differentiates OFDMA from SC-FDMA) ensures this PAPR relation. Since the symbol vectors $s(0), \ldots, s(N-1)$ are obtained using modulation constellations with limited peak powers, also $x(0), \ldots, x(N_c+N_{cp}-1)$ have limited peak power, which enables the use of cost effective relatively simple PAs.

The main problem with traditional SC-FDMA is the constraints it poses on the multi-antenna processing in the frequency domain (FD) and in the time domain (TD), since any of the following operations will significantly increase the PAPR of $x(0), \ldots, x(N_c+N_{cp}-1)$:

1. Linearly combining multiple elements of a FD symbol vector $s_k$ or a TD symbol vector $s(t)$.
2. Most frequency selective processing; that is, processing that varies over the frequency band. An exception is a linear phase shift of all FD symbols, which corresponds to a simple cyclic shift of the symbols in the time-domain.
3. Rearranging the FD symbols; that is, make $x_{k+m}$ depend on other symbols than $s_m$. For example, letting $x_k$ depend on $s_1$ and $x_{k+1}$ on $s_0$, changes the frequency mapping of the symbols, which results in increased PAPR.

In single transmit antenna systems, these constraints are not particularly limiting. However, for MIMO systems these constraint pose sever limitations on the kind of processing that can be applied. For example, unconstrained frequency flat precoding, frequency selective precoding, as well as traditional space-frequency block coding (SFBC), all violate any of the above mentioned constraints 1.-3. which will result in an increase of the PAPR, as explained further below.

A straightforward solution for using more sophisticated multi-antenna processing is to ignore a PAPR increase and simply use sufficiently powerful PAs to handle the increased PAPR that is introduced by the FD multi-antenna processing. This approach suffers however from the obvious disadvantages of increased power consumption, increased heat dissipation, increased chip/radio-module size, and increased component cost.

In traditional frequency flat precoding, the FD symbol vectors, $s_0, \ldots, s_{N-1}$, are mapped into the FD transmit symbol vectors, $x_{0+k}, \ldots, x_{N-1+k}$, using a matrix multiplication as, $$x_{m+k} = Ws_m,$$

where W is the precoding matrix. The frequency flat precoding can also be implemented in the TD as $$\tilde{s}(t) = Ws(t).$$

Unless there is explicit structure in W, each element in $x_{m+k}$ will be a linear combination of all the elements in $s_m$ (in case of TD precoding, $\tilde{s}(t)$ is a linear combination of s(t)), which clearly violates at least the first of the above mentioned constraints on the FD and TD processing. To satisfy the constraints, each row of W can at most have a single non-zero element, corresponding to the single element in $s_m$ (or s(t)) that the antenna (of that row) depends on.

The reduced degrees of freedom in the design of such a PAPR friendly precoder W will however penalize the efficiency of the MIMO processing, and thus also the MIMO gain of the link.

In wideband frequency allocations the effective propagation channel can change significantly over the sub-carriers. To match the varying channel, the precoder matrix should be adapted accordingly to provide frequency selective precoding, resulting in the following mapping $$x_{m+k} = W_m s_m,$$

where the precoder $W_m$ may be different for each sub-carrier. However, even if each precoder matrix only has a single non-zero element per row, as mentioned above, the frequency selectivity clearly violates the constraints for preserved PAPR properties.

Space Frequency Block Coding (SFBC) is the working assumption for downlink open-loop rank one transmission (only a single data stream is transmitted in parallel) in the 3GPP LTE specifications. In case of two transmit antennas, pairs of FD symbols, $(s_{2n}, s_{sn+1})$, are encoded jointly to form a pair of FD transmit symbol vectors $(x_{k+2n}, x_{k+2n+1})$ using the classical Alamouti mapping:

$$x_{k+2n} = \begin{bmatrix} s_{2n} \\ s_{2n+1}^c \end{bmatrix}, \text{ and } x_{k+2n+1} = \begin{bmatrix} s_{2n+1} \\ -s_{2n}^c \end{bmatrix}.$$

This encoding schemes violate constraints (the above mentioned constraint 3.) for preserving the low PAPR; the second antenna rearranges the symbol dependence; that is, $[x_{k+2n}]_2$ depends on $s_{2n+1}$, and $[x_{k+2n+1}]_2$ depends on $s_{2n}$ (where $[x]_m$ denotes the mth element of the vector x). Hence, the coding scheme does not satisfy the constraints for preserving the PAPR relation for all antennas.

SUMMARY

The object of the present invention is to achieve a solution for handling the increased PAPR that is introduced by the FD and/or TD multi-antenna processing.

This is achieved by isolating the PAPR increase to one, or a few antennas, that are matched with more powerful PAs, whereas the remaining antennas may use simpler/smaller PAs amplifying signals with smaller PAPRs.

Hence the embodiments of the present invention provides a solution to the increased PAPR when MIMO processing is applied in the frequency domain in SC-FDMA such as LTE. A particularly important exemplary embodiment is a UE supporting both LTE release 8 compliant single antenna single carrier transmission and multi-antenna single-carrier transmissions corresponding to a later LTE release, where a more powerful PA designed for single antenna LTE release 8 operation (for backwards compatibility) takes care of the signals with large PAPR and less powerful PAs in support of multi-antenna operation of the later LTE releases takes care of the signals with smaller PAPR.

According to a first aspect of the present invention a method in a transmitter is provided. The transmitter comprises multiple antenna ports each associated with a power amplifier (PA) for transmitting signals on the multiple antenna ports, amplified by the associated power amplifiers. In the method, multi-antenna processing of the signals is divided into a PAPR robust processing part and a PAPR ignorant processing part. The output signals of the PAPR robust processing are transmitted by a first group of antenna ports and the output signals of the PAPR ignorant processing are transmitted by a second group of antenna ports, wherein the PAs of the antenna ports of the second group are more powerful than the PAs of the antenna ports of the first group.

According to a second aspect of the present invention a transmitter is provided. The transmitter comprises multiple antenna ports each associated with a power amplifier (PA) for transmitting signals on the multiple antenna ports, amplified by the associated power amplifiers. The transmitter comprises a controller for dividing multi-antenna processing of the signals in the frequency domain into a PAPR robust processing part and a PAPR ignorant processing part. The transmitter further comprises a PAPR robust processing unit for performing the PAPR robust processing, a PAPR ignorant processing unit for performing perform the PAPR ignorant processing, a first group of antenna ports for transmitting the output signals of the PAPR robust processing unit and a second group of antenna ports for transmitting the output signals of the PAPR ignorant processing unit. The PAs of the antenna ports of the second group are more powerful than the PAs of the antenna ports of the first group.

According to an embodiment of the present invention the PAPR robust processing implies that the signals processed by the PAPR robust processing for each associated antenna port only comprises one single signal of the input signals of the PAPR robust processing.

The PAPR robust processing may not change over frequency.

The multiple-antenna processing may comprise precoding with a precoding matrix which size is a number of Tx antennas times number of streams to be transmitted in parallel in the symbol vectors and the PAPR robust processing part comprises precoder matrix rows with only a single non-zero element. Furthermore, the precoding may be frequency selective, and the precoder matrix rows with frequency dependence may belong to the PAPR ignorant processing.

According to a further embodiment, the PAPR robust processing may imply that each frequency domain symbol processed by the PAPR robust processing only depends on the corresponding frequency domain symbol of the input signals of the PAPR robust processing. Furthermore, the multiple-antenna processing may comprise space frequency coding, and the PAPR robust processing may only comprise processing that does not rearrange symbols in frequency. The space frequency coding may comprise a two Tx antenna Alamouti coding, and the PAPR robust processing may comprise an operation of transmitting the frequency domain symbols unprocessed.

An advantage with embodiments of the present invention is, by applying the proposed structuring of the processing, it is sufficient with designing only one or some of the PAs to cope with the dynamic range required by increased PAPR ratios. Such a PA may in many cases still be required for other reasons; for legacy system support as exemplified by considering a setting where UEs with multiple transmit antennas must be able to function equally well as UEs with a single transmit antenna even if the basestation/eNodeB is only LTE release 8 capable and hence from a baseband processing point of view only sees a single transmit antenna from each UE. UEs with multiple transmit antennas hence need to be able to transmit with the same total power as single transmit antenna UEs. Since the eNodeB only sees a single transmit antenna the UE might be required to be able to transmit the total power level on a single antenna. (Simultaneously transmitting from all antennas is an alternative option but such an approach may suffer from having an effective antenna diagram with undesirable ripples and nulls in various directions.) However, when using all antennas the overall transmitted power cannot exceed the total radiated power corresponding to a single antenna transmission due to e.g. specific absorption rate (SAR) limits. Therefore, when using all antennas, the power on each antenna must be less than what the PA of the single antenna can deliver. The UE may therefore use less powerful PAs for the remaining antennas, compared to the PA of the antenna selected for single antenna transmission in a release 8 compliant manner. In such a scenario the powerful PA can manage an increased PAPR, whereas the average power is the same as the remaining antennas.

The embodiments of the present invention thus allows for efficient MIMO processing, resulting in greater coverage and/or information throughput, with simple hardware that has low power consumption, low heat dissipation, small chip/radio-module size, and low component cost.

DETAILED DESCRIPTION

Figure 1:
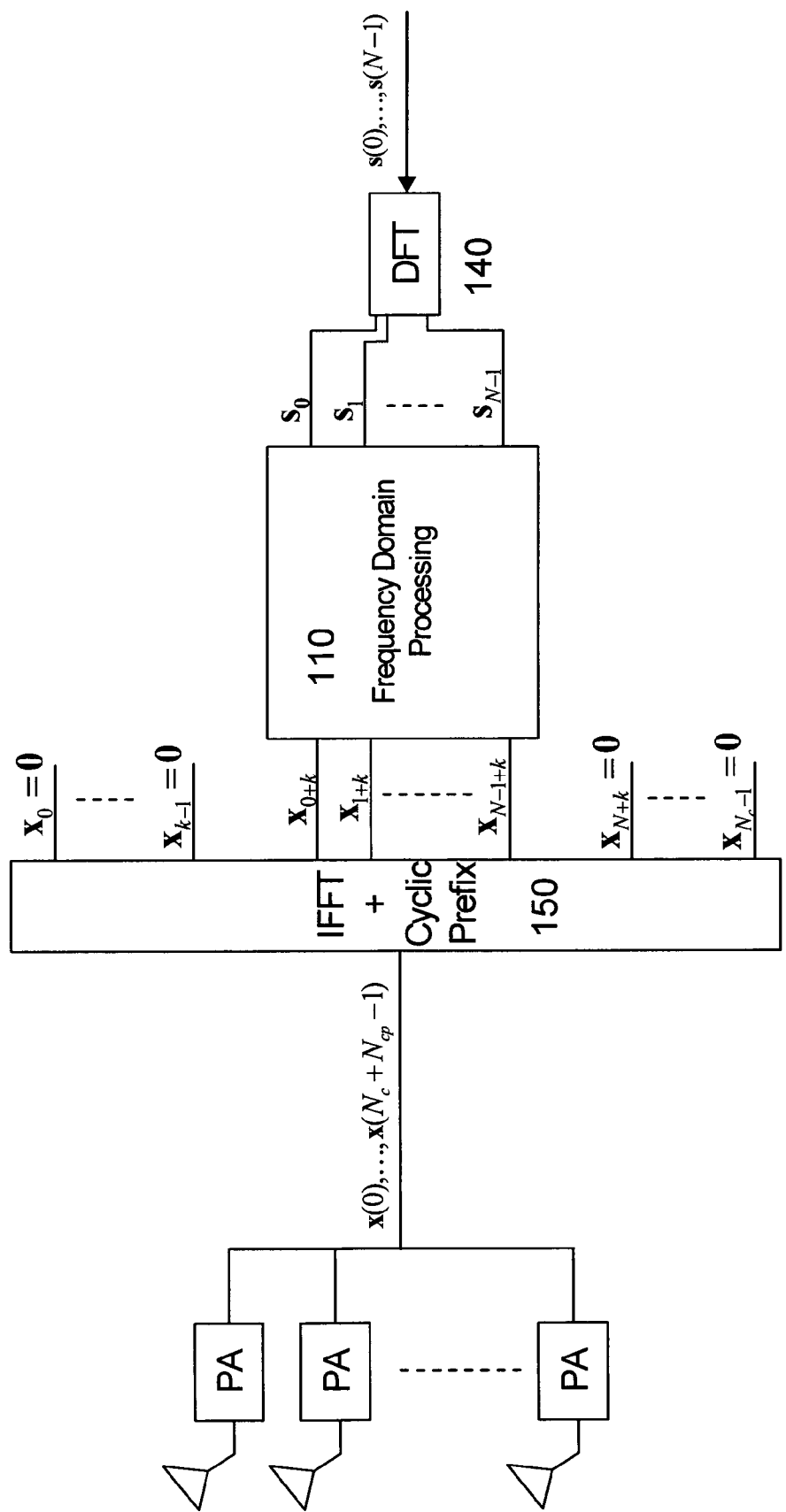
FIG. 1 is an illustration of a SC-FDMA transmission scheme (with processing in FD) according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 6:
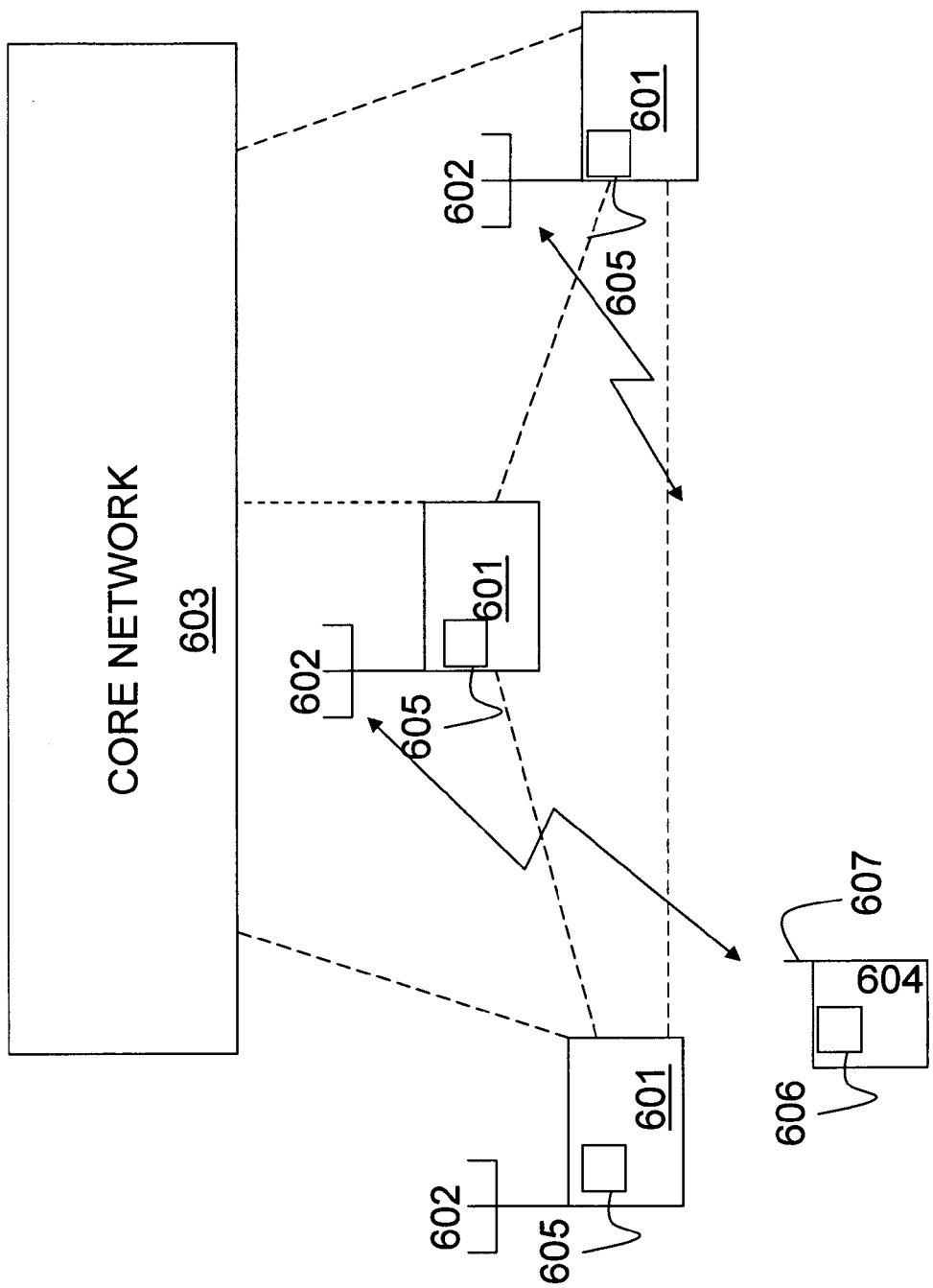
FIG. 6 shows a network wherein the embodiments of the present invention may be implemented.

FIG. 6 illustrates a Long Term Evolution (LTE) network 600 wherein the embodiments of the present invention may be implemented. Radio base stations 601 referred to as eNode Bs are connected to a core network 603 and are also interconnected. Each eNode B 601 has a receiver 605 associated with an antenna 602 comprising a plurality of antenna ports. The eNode Bs communicate wirelessly with user equipments 604 comprising a transmitter 606 and an antenna 607 comprising multiple antenna ports. The present invention is directed to a transmitter 606 of an UE and to a method for the transmitter 606.

Note that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Also note that terminology such as NodeB and UE should be considering non-limiting and does in particular not imply a certain hierarchical relation between the two; in general "NodeB" could be considered as device 1 and "UE" device 2, and these two devices communicate with each other over some radio channel.

The multi-antenna processing is divided into a PAPR robust part, where any PAPR increase must be avoided, and a PAPR ignorant part, where PAPR is not regarded an issue. The output of the PAPR robust part, $x_{k+n}^{(R)}$, is mapped onto simple PAs (smaller less powerful PAs) and the output of the PARP ignorant part, $x_{k+n}^{(I)}$, is mapped onto powerful PAs. A powerful PA implies a PA capable of transmitting a signal with relatively high PAPR (for a given average Tx power) while a simple PA implies a PA with less tolerance to high PAPR (for a given average Tx power) than a powerful PA.

Figure 2:
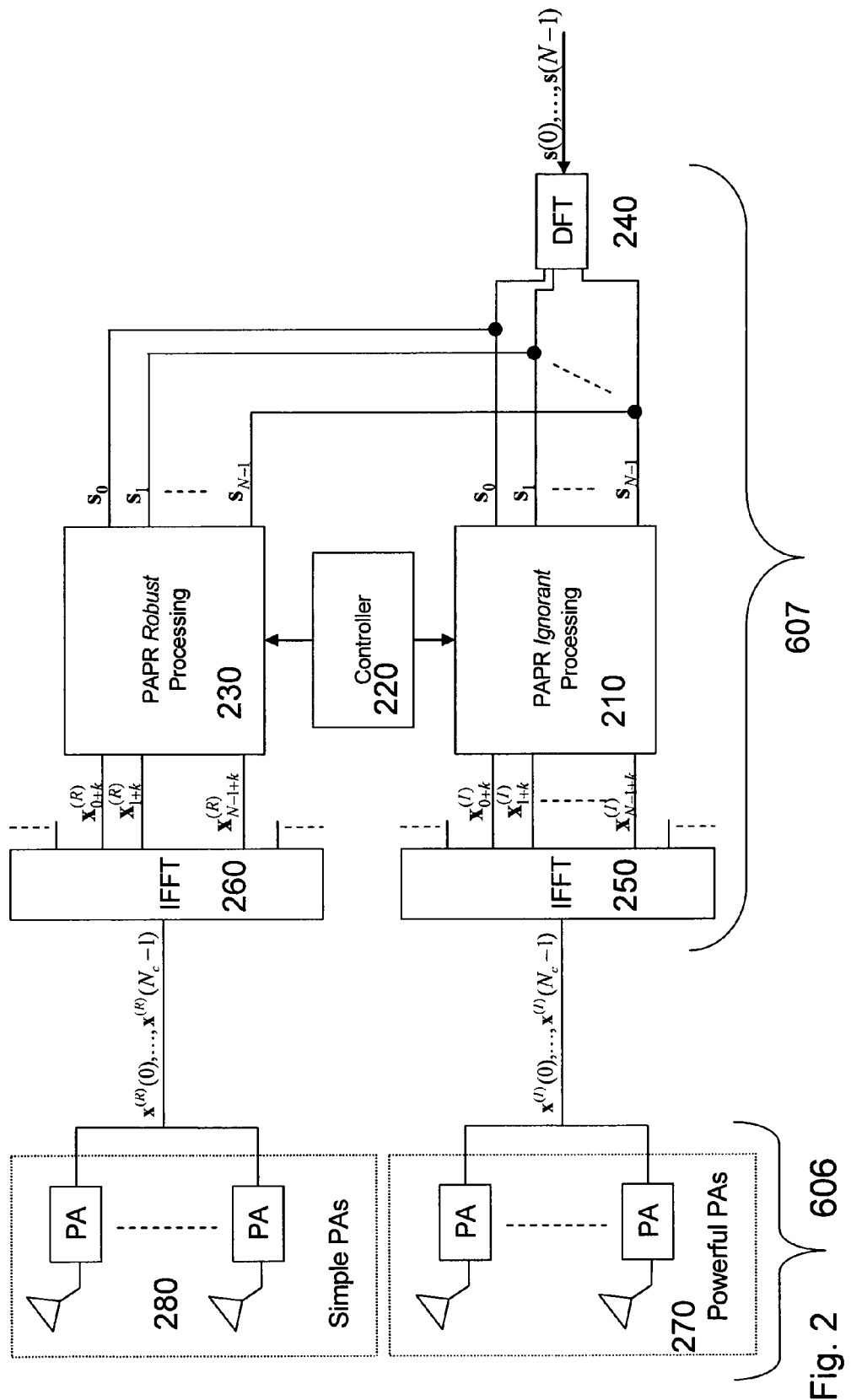
FIG. 2 illustrates schematically a transmitter according to embodiments of the present invention (with processing in the FD).
Figure 5:
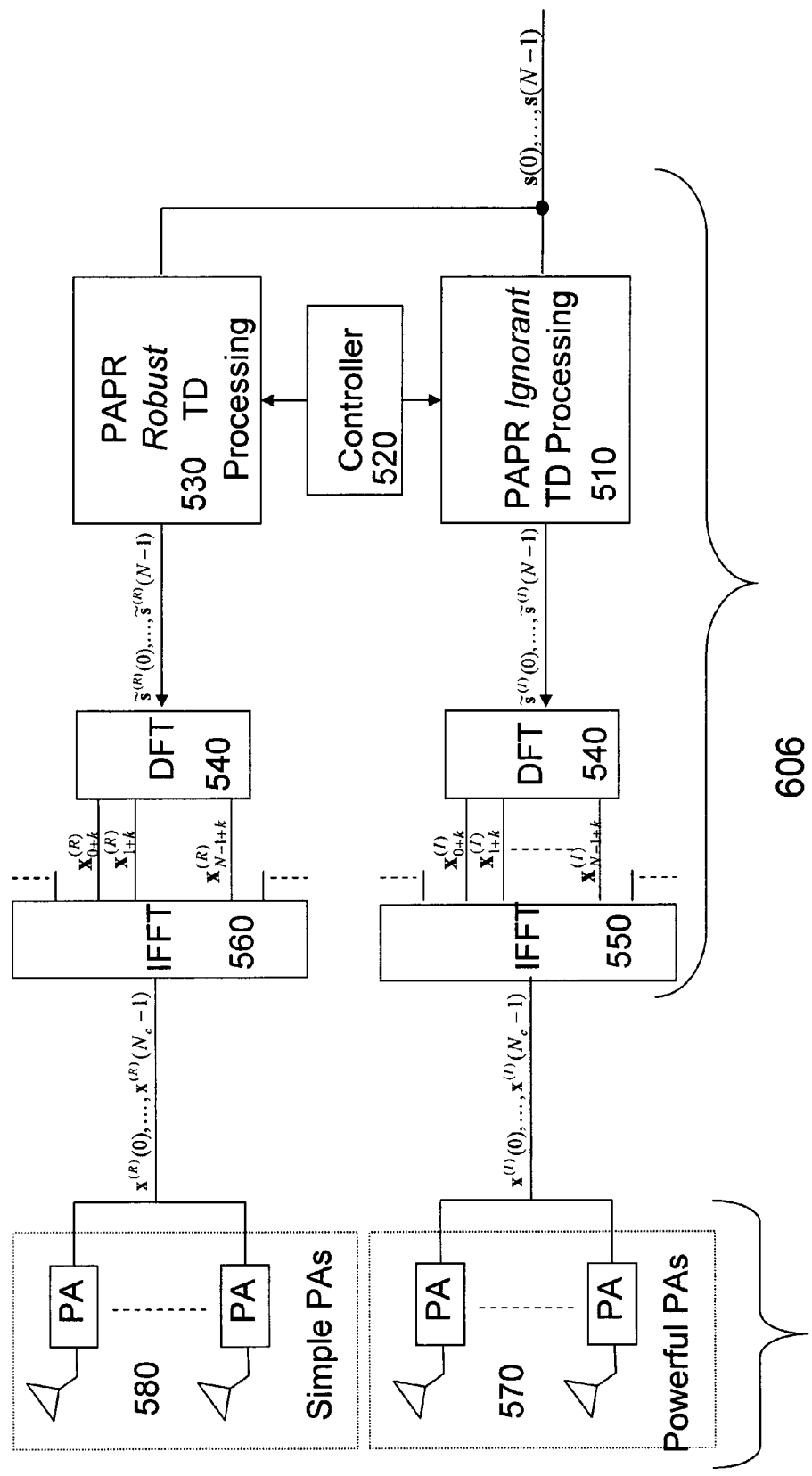
FIG. 5 illustrates schematically a transmitter according to embodiments of the present invention (with processing in the TD).

The transmitter according to embodiments of the present invention is schematically illustrated by FIG. 2 and FIG. 5, for FD and TD multi-antenna processing, respectively. The transmitter of FIG. 2 corresponds to the transmitter of FIG. 1 except that the frequency domain multi-antenna processing of FIG. 1 is divided into PAPR robust multi-antenna processing part 230 and PAPR ignorant multi-antenna processing part 210 and the controller 220 controls the division of the processing between the PAPR robust processing 230 and PAPR ignorant processing 210. A further difference is that the PAs are divided into one group 280 of simple PAs and one group 270 of powerful PAs. It should be noted that the DFT block 240 and the IFFT blocks 250; 260 correspond to the DFT and the IFFT blocks of FIG. 1.

Figure 4:
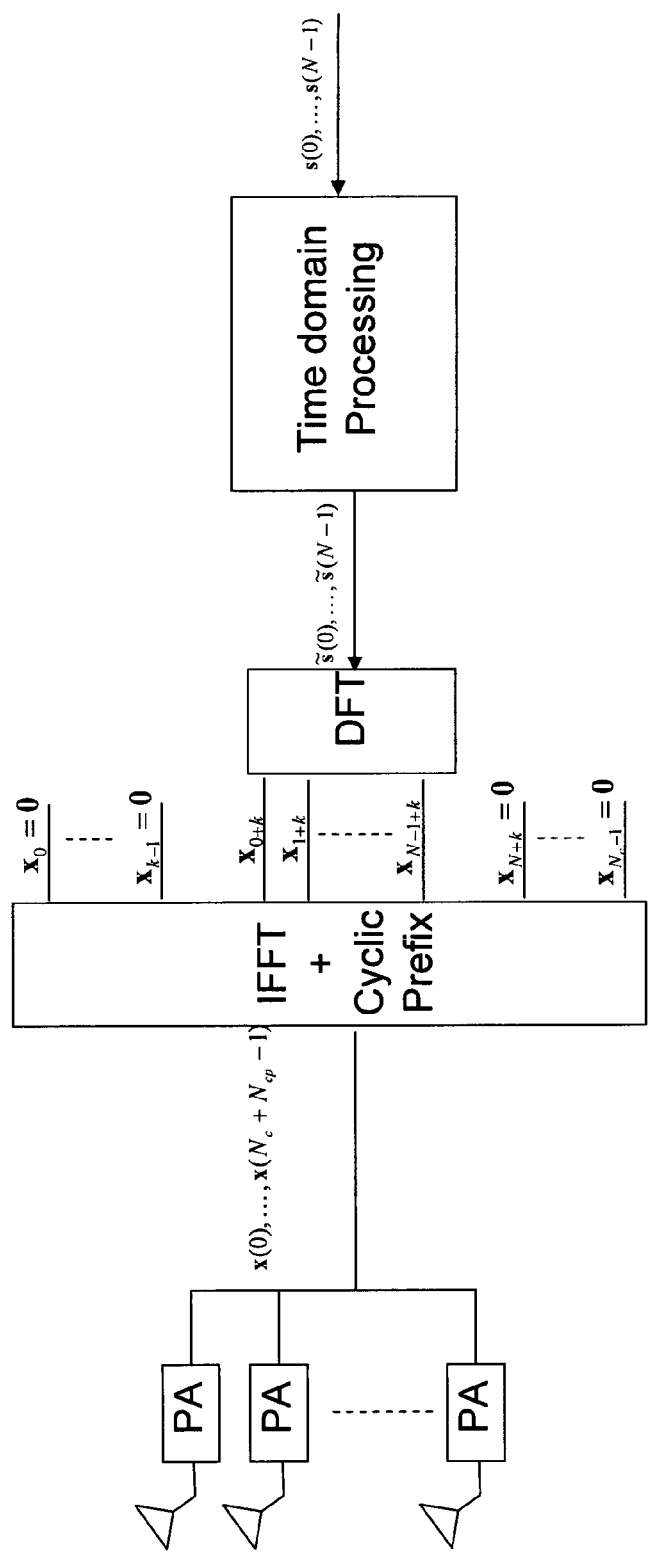
FIG. 4 is an illustration of a SC-FDMA transmission scheme (with processing in TD) according to prior art.

The transmitter of FIG. 5 corresponds to the transmitter of FIG. 4 except that the time domain multi-antenna processing of FIG. 4 is divided into PAPR robust processing part 530 and PAPR ignorant processing part 510 and the controller 520 controls the division of the processing between the PAPR robust multi-antenna processing 530 and PAPR ignorant multi-antenna processing 510. A further difference is that the PAs are divided into one group 580 of simple PAs and one group 570 of powerful PAs. It should be noted that the DFT block 540 and the IFFT blocks 550; 560 correspond to the DFT and the IFFT blocks of FIG. 4.

In the following specification, for simplicity, the non-limiting assumption is made that the elements in x(t) are ordered so that the antennas with the simple PAs 280 correspond to the first elements and the elements with the powerful PAs 270 correspond to the last elements; that is, $$x(t) = \begin{bmatrix} x^{(R)}(t) \\ x^{(I)}(t) \end{bmatrix}.$$

The explicit numbering of the antenna ports is irrelevant for the invention; there is a one-to-one mapping between each element in the transmit symbol vector, x(t), and the antenna ports.

Thus the transmitter 606 of a UE according to FIG. 2 and FIG. 5 comprises multiple antenna ports for transmitting signals on the multiple antenna ports. Each antenna port is associated with a power amplifier, and the signals are amplified by the associated power amplifiers. As stated above, the transmitter comprises a controller 220 for dividing the processing of the signals in the frequency domain into a PAPR robust processing and a PAPR ignorant processing. The PAPR robust processing unit 230 performs the PAPR robust processing and a PAPR ignorant processing unit 210 performs the PAPR ignorant processing. Moreover, the antenna ports are divided into a first group of antenna ports for transmitting the output signals of the PAPR robust processing and a second group of antenna ports for transmitting the output signals of the PAPR ignorant processing, wherein the antenna ports of the second group are more powerful than the antenna ports of the first group.

The precoder design corresponding to the structure of FIG. 2 and FIG. 5, is given by the precoder matrix $$W = \begin{bmatrix} W^{(R)} \\ W^{(I)} \end{bmatrix},$$

where the first rows, $W^{(R)}$, corresponds to the PAPR robust processing and, the remaining rows, $W^{(I)}$, corresponds to the PAPR insensitive processing; for example, in the FD multi-antenna processing $$x_n = W s_n \Leftrightarrow \begin{cases} x_{k+n}^{(R)} = W^{(R)} s_n, \\ x_{k+n}^{(I)} = W^{(I)} s_n. \end{cases}$$

In the design of $W^{(R)}$ it has to be ensured that PAPR is not increased; that is, $W^{(R)}$ must contain at most one non-zero element per row. However, $W^{(I)}$ may be chosen without any PAPR considerations.

The processing structure of the proposed invention may also be applied to allow for frequency selective precoding. Similarly to the case above, the frequency selective precoder matrix is divided as $$W_m = \begin{bmatrix} W_m^{(R)} \\ W_m^{(I)} \end{bmatrix}$$

where PAPR robust part, $W^{(R)}$, is static over the sub-carriers and only has a single non-zero element per row. The PAPR insensitive part, $W_m^{(I)}$, on the other hand, can vary over frequency and may be chosen arbitrarily. Furthermore, from a link capacity point of view, two precoders, $W_m$ and $\tilde{W}_m$, are equivalent if they are equal up to phase rotations of the columns, that is $$W_m = \tilde{W}_m \begin{bmatrix} e^{j\varphi_1} & 0 & \cdots & 0 \\ 0 & \ddots & & \vdots \\ \vdots & & \ddots & 0 \\ 0 & \cdots & 0 & e^{j\varphi_r} \end{bmatrix}.$$

Hence, the columns of a precoder matrix can always be rotated such that the first non-zero element in each column is real valued. Since precoder based adjustments of the phase are typically the most important, this rotational invariance motivates the commonly encountered constraint of setting the element to a constant and positive value. Thus, the frequency selectivity of the first rows may be removed and the frequency selective rotations are confined to the remaining rows. Given that the first rows of a frequency selective precoder, $\tilde{W}_m^{(R)}$, only contain a single non-zero element per row (as required not to break the limited PAPR), and at most one non-zero element per column, then the frequency selective behavior may be completely eliminated. That is, say that the desired precoders to use are given by $$\tilde{W}_m = \begin{bmatrix} \tilde{W}_m^{(R)} \\ \tilde{W}_m^{(I)} \end{bmatrix}, 0 \le m \le N-1,$$

Then the rotated precoders, $$W_m = \begin{bmatrix} W^{(R)} \\ W_m^{(I)} \end{bmatrix} = \tilde{W}_m \begin{bmatrix} e^{j\varphi_{1,m}} & \cdots & 0 \\ \vdots & \ddots & \vdots \\ 0 & \cdots & e^{j\varphi_{r,m}} \end{bmatrix},$$

where $-\phi_{l,m}, \ldots, -\phi_{r,m}$ are the phases of the first non-zero element in each column of $\tilde{W}_m$, support the same data rates. Consequently, the frequency selectivity has been removed in $W^{(R)}$. For example, consider precoding of three data streams, at a transmitter with a single powerful PA and three simple PAs, then a potential precoder could have the following structure:

$$\tilde{W}_m = \begin{bmatrix} e^{-j\varphi_{1,m}} & 0 & 0 \\ 0 & e^{-j\varphi_{2,m}} & 0 \\ 0 & 0 & e^{-j\varphi_{3,m}} \\ \alpha_m & \beta_m & \gamma_m \end{bmatrix},$$

where $\alpha_m$, $\beta_m$, and $\gamma_m$ are some complex valued scalars. With the rotation proposed above, instead of using $\tilde{W}_m$, the transmitter could equally well use the rotated precoder $$W_m = \begin{bmatrix} 1 & 0 & 0 \\ 0 & 1 & 0 \\ 0 & 0 & 1 \\ \alpha_m e^{j\varphi_{1,m}} & \beta_m e^{j\varphi_{2,m}} & \gamma_m e^{j\varphi_{3,m}} \end{bmatrix},$$

where the first three rows are constant and do not change over frequency. Embodiments of the present invention includes the use of precoders belonging to a pre-designed codebook of precoders that can be segmented in as $$W_m = \begin{bmatrix} W^{(R)} \\ W_m^{(I)} \end{bmatrix}$$

as well as non-codebook based precoding, where each precoder is forced to satisfy the proposed structure constraints.

Embodiments of the present invention can also be applied to allow for SFBC coding. In the two transmit antenna case the processing can be divided into one antenna with PAPR robust processing, $$x_{k+2n}^{(R)} = s_{2n}, \text{ and } x_{k+2n+1}^{(R)} = s_{2n+1},$$

and one antenna with PAPR insensitive processing as $$x_{k+2n}^{(I)} = s_{2n+1}^c, \text{ and } x_{k+2n+1}^{(I)} = -s_{2n}^c.$$

Hence, if one PA is more powerful than the other—because of for instance legacy system support—then SFBC can be used by means of the present invention.

Figure 3:
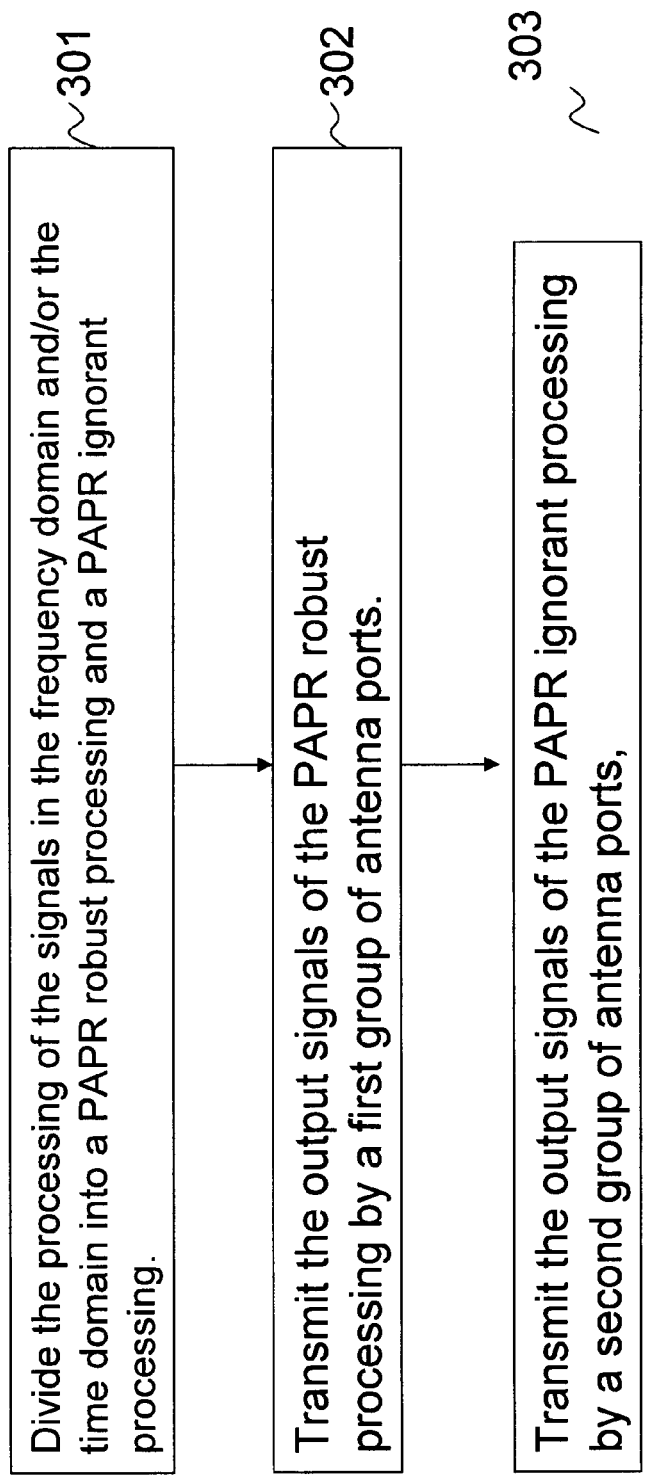
FIG. 3 is a flowchart of the method according to embodiments of the present invention.

FIG. 3 illustrates one embodiment of a method performed in the transmitter of a UE. The method begins at step 301. At step 301, the multi-antenna processing of the signals is divided into a PAPR robust processing part 230,530 and a PAPR ignorant processing part 210, 510. This division is controlled by a controller 220,520. At step 302, the output signals of the PAPR robust processing are transmitted by a first group of antenna ports 280,580. At step 303, the output signals of the PAPR ignorant processing are transmitted by a second group of antenna ports 270,570. In one embodiment, the PAs of the antenna ports of the second group are more powerful than the PAs of the antenna ports of the first group. A powerful PA implies a PA capable of transmitting a signal with relatively high PAPR (for a given average Tx power) while a simple PA implies a PA with less tolerance to high PAPR (for a given average Tx power) than a powerful PA.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of transmitting signals using a multi-antenna transmitter, the method comprising:
    generating a first group of output signals by performing a first set of one or more operations on a plurality of input signals, wherein the first set of operations do not increase a peak-to-average-power-ratio (PAPR) associated with the input signals;
    generating a second set of output signals by performing a second set of one or more operations on the plurality of input signals, wherein the second set of operations increase a PAPR associated with the input signals;
    amplifying the first group of output signals using a first group of power amplifiers (PAs);
    transmitting the amplified first group of output signals over a first group of antenna ports associated with the first group of PAs;
    amplifying the second group of output signals using a second group of PAs, wherein the second group of PAs have a greater amplifying power than the first group of PAs;
    transmitting the amplified second group of output signals over a second group of antenna ports associated with the second group of Pas; and
    precoding the input signals using a precoding matrix having a size equal to a number of antennas that will be used to transmit the input signals times a number of streams to be transmitted in parallel in transmitting the input signals, wherein
        performing the first set of operations on the input signals comprises applying a first set of rows from the precoding matrix to the input signals, wherein the first set of rows each include at most one non-zero element, and
        performing the second set of operations on the input signals comprises applying a second set of rows with frequency dependence from the precoding matrix to the input signals, wherein the second set of rows each include a plurality of non-zero elements.

2. The method of claim 1, wherein:
    transmitting the amplified first group of output signals comprises transmitting the amplified first group of output signals using a single-carrier frequency division multiple access (SC-FDMA) transmission scheme; and
    transmitting the amplified second group of output signals comprises transmitting the amplified second group of output signals using an SC-FDMA transmission scheme.

3. The method of claim 1, wherein generating a first group of output signals comprises generating, for each of the first group of antenna ports, an output signal based on a single one of the input signals.

4. The method of claim 1, wherein the second set of operations comprises one or more frequency-dependent operations.

5. The method of claim 1, further comprising precoding the input signals using a precoding matrix having a size equal to a number of antennas that will be used to transmit the input signals times a number of streams to be transmitted in parallel in transmitting the input signals, and wherein:
    performing the first set of operations on the input signals comprises applying a first set of rows from the precoding matrix to the input signals, wherein the first set of rows do not include any frequency-dependent elements; and
    performing the second set of operations on the input signals comprises applying a second set of rows from the precoding matrix to the input signals, wherein the second set of rows each include a frequency dependent element.

6. The method of claim 1, further comprising encoding the input signals according to a Space-Frequency Block Coding (SFBC) scheme, and wherein:
    the plurality of input signals comprise an input sequence of frequency-domain (FD) symbols;
    generating the first group of output signals comprises generating a first group of output sequences based on the input sequence, wherein each of the first group of output sequences is generated based on a respective portion of the FD symbols in the input sequence, wherein the respective portion has a same order as in the input sequence; and
    generating the second group of output signals comprises generating a second group of output sequences based on the input sequence, wherein each of the second group of output sequences is generated based on a respective portion of the FD symbols in the input sequence, wherein the respective portion has a different order from the input sequence.

7. The method of claim 6, wherein:

the SFBC scheme comprises a two-transmit-antenna, Alamouti encoding scheme; and generating the first group of output signals comprises generating a first group comprising a single output sequence identical to the input sequence.

8. A multi-antenna transmitter, comprising:

a first processing part operable to generate a first group of output signals by performing a first set of one or more operations on a plurality of input signals, wherein the first set of operations do not increase a peak-to-average-power-ratio (PAPR) associated with the input signals;

a first group of power amplifiers (PAs) operable to amplify the first group of output signals;

a first group of antenna ports operable to transmit the amplified first group of output signals;

a second processing part operable to generating a second set of output signals by performing a second set of one or more operations on the plurality of input signals, wherein the second set of operations increase a PAPR associated with the input signals;

a second group of PAs operable to amplify the second group of output signals, wherein the second group of PAs have a greater amplifying power than the first group of PAs;

a second group of antenna ports operable to transmit the amplified second group of output signals over a second group of antenna ports associated with the second group of PAs; and a controller for controlling operation of the first processing part and the second processing part in transmitting signals, wherein the transmitter is operable to precode the input signals using a precoding matrix having a size equal to a number of antennas that will be used to transmit the input signals times a number of streams to be transmitted in parallel in transmitting the input signals, the first processing part is operable to perform the first set of operations on the input signals by applying a first set of rows from the precoding matrix to the input signals, wherein the first set of rows each include at most one non-zero element, and the first processing part is operable to perform the second set of operations on the input signals by applying a second set of rows with frequency dependence from the precoding matrix to the input signals, wherein the second set of rows each include a plurality of non-zero elements.

9. The transmitter of claim 8, wherein the transmitter is operable to transmit the amplified first group of output signals and the amplified second group of output signals using a single-carrier frequency division multiple access (SC-FDMA) transmission scheme.

10. The transmitter of claim 8, wherein the first processing part is operable to generate a first group of output signals by generating, for each of the first group of antenna ports, an output signal based on a single one of the input signals.

11. The transmitter of claim 8, wherein the second set of operations comprises one or more frequency-dependent operations.

12. The transmitter of claim 8, wherein the transmitter is operable to precode the input signals using a precoding matrix having a size equal to a number of antennas that will be used to transmit the input signals times a number of streams to be transmitted in parallel in transmitting the input signals, and wherein:

the first processing part is operable to perform the first set of operations on the input signals by applying a first set of rows from the precoding matrix to the input signals, wherein the first set of rows do not include any frequency-dependent elements; and the first processing part is perform the second set of operations on the input signals by applying a second set of rows from the precoding matrix to the input signals, wherein the second set of rows each include a frequency dependent element.

13. The transmitter of claim 8, wherein the transmitter is operable to encode the input signals according to a Space-Frequency Block Coding (SFBC) scheme, and wherein:

the plurality of input signals comprise an input sequence of frequency-domain (FD) symbols;

the first processing part is operable to generate the first group of output signals by generating a first group of output sequences based on the input sequence, wherein each of the first group of output sequences is generated based on a respective portion of the FD symbols in the input sequence, wherein the respective portion has a same order as in the input sequence; and the second processing part is operable to generate the second group of output signals by generating a second group of output sequences based on the input sequence, wherein each of the second group of output sequences is generated based on a respective portion of the FD symbols in the input sequence, wherein the respective portion has a different order from the input sequence.

14. The transmitter of claim 13, wherein:

the SFBC scheme comprises a two-transmit-antenna, Alamouti encoding scheme; and the first processing part is operable to generate the first group of output signals by generating a first group comprising a single output sequence identical to the input sequence.

* * * * *

UNITED STATES PATENT AND TRADEMARK OFFICE
CERTIFICATE OF CORRECTION

PATENT NO. : 8,873,533 B2  
APPLICATION NO. : 13/128924  
DATED : October 28, 2014  
INVENTOR(S) : Hammarwall et al.

Page 1 of 1

It is certified that error appears in the above-identified patent and that said Letters Patent is hereby corrected as shown below:

In the Drawings,

In Fig. 3, Sheet 3 of 6, for Tag "303", in Line 2, delete "ports," and insert -- ports. --, therefor.

In the Specification,

In Column 8, Line 41, delete "$-\phi_{l,m}, \ldots, -\phi_{r,m}$" and insert -- $-\varphi_{l,m}, \ldots, -\varphi_{r,m}$ --, therefor.

In the Claims,

In Column 10, Line 7, in Claim 1, delete "Pas;" and insert -- PAs; --, therefor.

Signed and Sealed this  
Twelfth Day of May, 2015

Michelle K. Lee  
*Director of the United States Patent and Trademark Office*